3,109,915
METHOD OF AND APPARATUS FOR MACHINING WORK AT ELEVATED TEMPERATURE
Jens L. Wennberg, Cincinnati, Ohio, and William Pentland, Ithaca, N.Y., assignors to The Cincinnati Milling Machine Co., Cincinnati, Ohio, a corporation of Ohio
Filed June 8, 1961, Ser. No. 115,748
15 Claims. (Cl. 219—68)

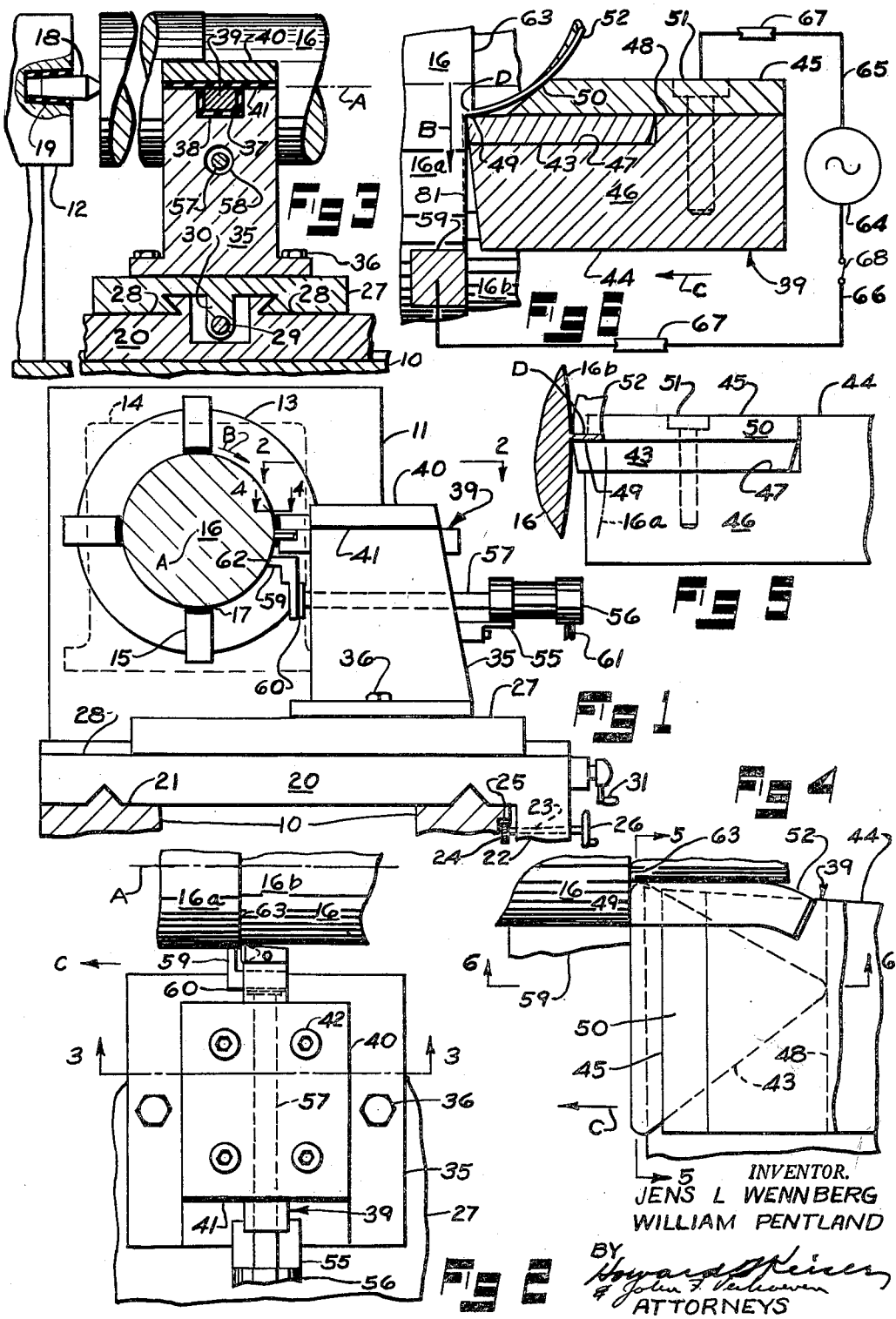

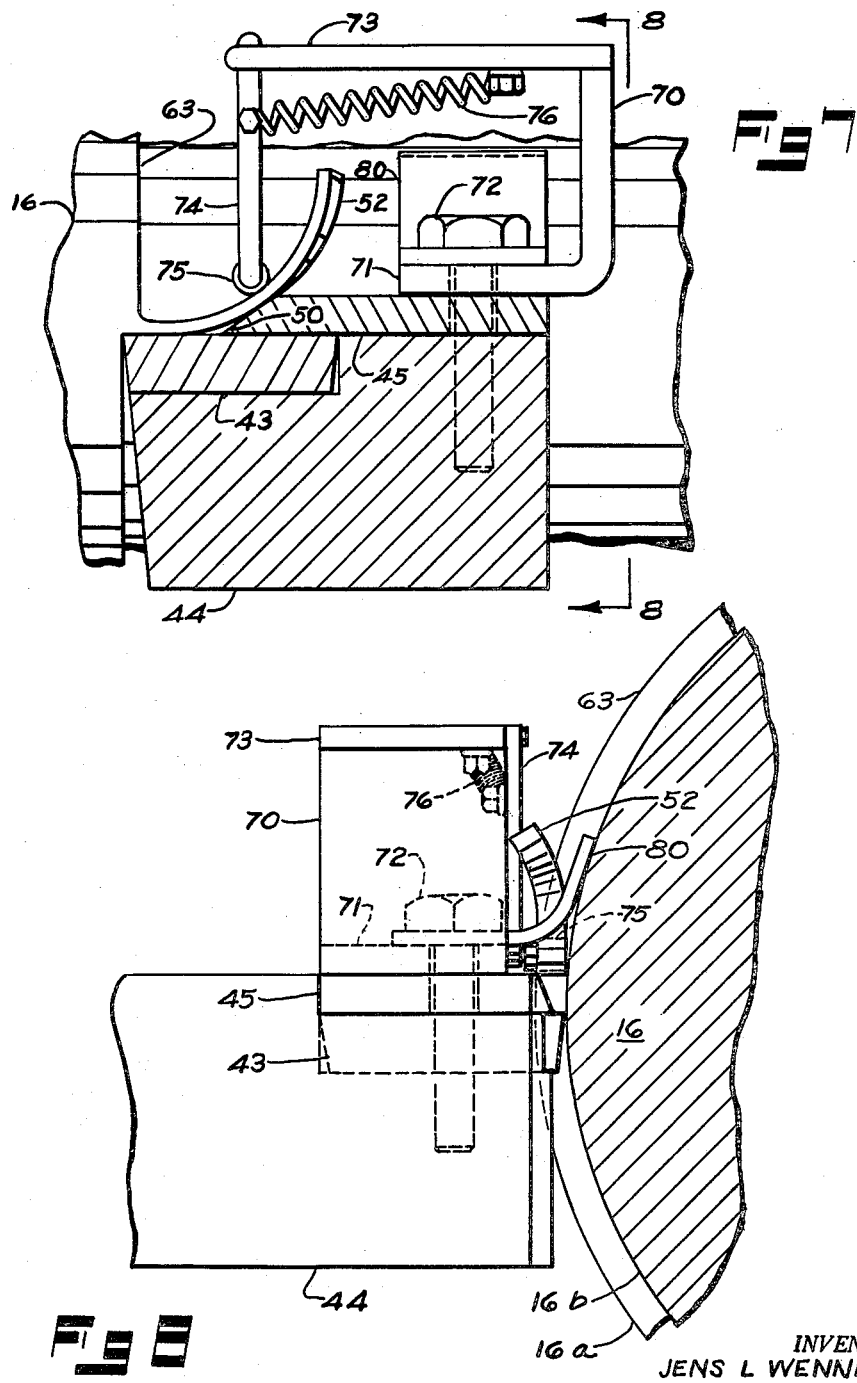

The present invention relates to a method of an apparatus for machining work at an elevated temperature.

Many investigators have found that beneficial results can be attained by machining work at elevated temperatures, particularly work difficult to machine at room temperature. Among the benefits reported in specific hot machining investigations are prolonged tool life, higher cutting speeds and feed rates, superior surface finish, and reduction in power requirements.

For this type of machining it is only heat applied at the shear zone (where the chip is separating from the workpiece) which facilitates the machining. Any heat generated in other portions of the work not only is wasted, lowering the efficiency of the operation, but may impair the workpiece for its intended use since heat can change the characteristics of the material. For this reason heating which tends to penetrate the workpiece appreciably deeper than the skin area which is to be removed by the machining must be avoided when the characteristics resulting from such heating are not desired in the finished workpiece.

Currents produced in the workpiece from a radio frequency voltage source will heat the surface only of the workpiece and techniques are known to concentrate the radio frequency current along a predetermined path on the surface of the workpiece. However, maximum efficiency and best results in cutting at elevated temperatures can be achieved only if the cutting tool is precisely located relative to the localized area which is heated, and only if the cutting tool remains in the locally heated area during the entire cut. The proper positioning of the cutting tool relative to a locally heated area on an electrically conductive workpiece is assured in the present invention without the necessity of delicate and time consuming adjustment of the tool relative to the workpiece, and the desired precise relation between the tool and the locally heated area of the workpiece is maintained during the entire cut despite the relative movement between the tool and the workpiece during the cut.

This is accomplished in the present invention by connecting one side of a source of radio frequency alternating voltage to an electrode at the tool and connecting the other side of said source to an electrode contacting the workpiece, preferably near the tool. When the tool is in contact with the workpiece, a radio frequency current is conducted along the surface of the workpiece through the precise area at which heat is needed to facilitate machining, that is through the shear zone of the workpiece adjacent the tool. Moreover, current will continue to pass through the changing shear zone during the entire cut regardless of relative movement between the tool and the workpiece during the cut. It is therefore one object of the present invention to provide a method of and apparatus for passing radio frequency current through the shear zone area of the workpiece during machining of the workpiece. It is another object of the present invention to use the tool as an electrode in passing radio frequency current through the workpiece for resistance heating of the shear zone of the workpiece material to facilitate machining.

For the same reason that current passing through the shear zone of a workpiece during a cut can render the workpiece more susceptible to the action of the cutting edge of the tool on the workpiece, so can current passing through the cutting edge of a tool render the cutting edge more susceptible to wearing action by the workpiece. It is therefore preferable that a current path be provided through the shear zone which circumvents the cutting edge of the tool. To accomplish this there is provided a conductor at the tool, which may be in the form of a conventional chipbreaker on the tool, to contact the chip peeling off and extending from the workpiece during the cut so that the current is conducted to the shear zone of the workpiece, not through the cutting edge of the tool, but through the conductor and chip around the cutting edge of the tool. It is therefore yet another object of the present invention to pass a radio frequency current through the shear zone but around the cutting edge of the tool. It is still another object of the present invention to utilize the tool chipbreaker as an electrode to pass current through the tool and chip around the cutting edge of the tool to effect resistance heating of the shear zone of the material with minimum resistance heating of the cutting edge of the tool.

With the radio frequency voltage source utilized in the present invention, magnetic members close to a current path along the conductor on the tool and along the workpiece surface will have radio frequency currents induced therein by the magnetic flux fluctuations resulting from the radio frequency alternating current in the conductor and workpiece, particularly when a voltage source in the preferred medium frequency range of 300 kilocycles to 3 megacycles is used. Heat generated in portions of the tool adjacent the conductor by these induced currents represents wasted energy and, in the case of the cutting edge of the tool, can contribute to the wear thereof. For this reason, a tool having a cutting bit and a bitholder made of nonmagnetic material, and therefore not significantly affected by the magnetic field produced by the current, is utilized in one embodiment of the present invention. It is therefore another object of the present invention to supply radio frequency current to the shear zone of a workpiece being machined with minimum current induced in, or conducted through, the cutting edge of the tool. It is yet another object of the present invention to pass radio frequency current through a tool chipbreaker for resistance heating of the shear zone of a workpiece with minimum induction heating of the tool bit or bitholder.

If the cutting bit is nonconducting as well as nonmagnetic, current cannot flow from the conductor on the tool to the workpiece through the cutting bit. In order to avoid destructive sparking between the conductor and the chip, it is desirable to assure that the contact between the conductor and the chip is not broken and/or to provide a parallel, higher impedance path which the current can take if contact between the conductor and the workpiece is broken. It is therefore another object of the present invention to pass radio frequency current through the chip into the shear zone without sparking.

Other objects and advantages of the present invention should be readily apparent by reference to the following specification, considered in conjunction with the accompanying drawings forming a part thereof, and it is to be understood that any modifications may be made in the exact details there shown and described, within the scope of the appended claims, without departing from or exceeding the spirit of the invention.

FIG. 1 is a view taken on a lateral plane through the base of a lathe constructed in accordance with the present invention;

FIG. 2 is a plan view taken on line 2—2 of FIG. 1;

FIG. 3 is a view in cross-section taken on line 3—3 of FIG. 2;

FIG. 4 is a greatly enlarged plan view taken on line 4—4 of FIG. 1;

FIG. 5 is a view taken on line 5—5 of FIG. 4;

FIG. 6 is a view taken on line 6—6 of FIG. 4 showing schematically the source of radio frequency alternating voltage;

FIG. 7 is a view taken as the view of FIG. 6 showing a modified form of the present invention; and FIG. 8 is a view taken on the line 8—8 of FIG. 7.

There is shown in FIGS. 1, 2, and 3, for illustrating the present invention, a machine tool which may, for example, be a lathe having a base 10 on which is mounted a headstock 11 with chuck 13 rotated by motor 14. The chuck 13 has jaws 15 movable radially to grip a workpiece 16 for rotation about axis A of the workpiece, and the jaws have pads of insulating material 17 at their inner ends where they engage the workpiece. A footstock 12 is mounted on the base 10 for positioning relative to the headstock and has a stationary center 18 to engage the end of the workpiece opposite the headstock. The center 18 is tightly received in a sleeve 19 of insulating material which is tightly received in the footstock 12. The pads 17 and sleeve 19 serve to electrically insulate the workpiece 16, which is of an electrical conducting material, from the machine.

The lathe has a carriage 20 slidably received on longitudinal ways 21 of the base for movement parallel to the axis A of the workpiece. The carriage 20 has an apron 22 in which a shaft 23 is journaled. At its inner end shaft 23 carries a pinion 24 engaged with rack 25 on the base, and longitudinal movement of the carriage is effected by rotation of a handwheel 26 secured on the outer end of shaft 23. A laterally movable cross-slide 27 is mounted on ways 28 of the carriage. A screw 29, journaled in the carriage, is threadedly received in a nut portion 30 of the cross-slide depending between ways 28, and rotation of a handwheel 31, mounted on the outer end of screw 29, effects movement of the cross-slide towards or away from the axis A of the workpiece. The above-described carriage and cross-slide is conventional lathe structure, and conventional lathe power feed mechanism may also be provided for selective power movement of carriage 20 and cross-slide 27 by motor 14.

A tool support 35 is secured to the cross-slide 27 by bolts 36. The tool support has a laterally extending groove 37 having an insulating liner 38 in which a tool, indicated generally at 39, is received. The tool support has a cap 40 with an insulating lower plate 41, and when the cap is screwed down tight by screws 42, the tool 39 is clamped in the toolholder and electrically insulated therefrom.

The tool 39 comprises a cutting bit 43, a bitholder 44, and a chipbreaker 45. The bitholder 44 is cut away across the top at its inner end (as shown in FIG. 5) to define an extending seat portion 46 which is stepped, as shown in FIG. 6, to define a well 47 to receive the bit 43 and a shelf 48 extending above the well. The bit shown for illustrative purposes is triangular and has a cutting edge 49 positioned for engagement with the workpiece.

The chipbreaker 45, which has a sloping face 50, is secured to shelf 48 of the bitholder by screw 51 and overlays the bit to clamp the bit in the bitholder. When the workpiece is rotated in the direction indicated by arrow B, and the tool is advanced into the workpiece (by handwheel 31) and fed longitudinally in the direction of arrow C (by handwheel 26) for cutting engagement with the rotating workpiece, a chip 52 peels off and extends from the workpiece, contacting the sloping face 50 of chipbreaker 45.

The tool support 35 has a bracket 55 which supports a cylinder 56 having a piston (not shown) slidably received therein. A piston rod 57 connected to the piston extends from the cylinder and through an opening 58 in the toolholder. An electrode 59 has a rear insulating plate 60 which is connected to the end of rod 57 so that the electrode 59 is supported by tool support 35 but is electrically insulated therefrom. When air under pressure is introduced through conduit 61 to the cylinder behind the piston, the electrode, which has a front face 62 shaped for mating engagement with the cylindrical workpiece, is urged into firm but sliding contact with the rotating workpiece. The face 62 of electrode 59 engages the workpiece on the unmachined portion 16a thereof and at the cut formed shoulder 63 which is between the unmachined portion 16a and the machined portion 16b of the workpiece. The electrode 59 is positioned near the tool in the direction B of workpiece travel from the cutting edge of the tool.

A generator 64 provides a source of radio frequency voltage of at least 10 kilocycles per second and has one side electrically connected by line 65 to an electrode at the tool (which may be the tool chipbreaker 45), and has the other side electrically connected by line 66 (when switch 68 in the line is closed) to the electrode 59 engaged with the workpiece. Each of the conductors 65, 66 may be cooled by coolant circulating through conduits, as indicated at 67. When the tool is in contact with the workpiece for cutting, and switch 68 is closed, radio frequency current is conducted through the shear zone D of the workpiece where the cutting edge of the tool contacts the workpiece, and along the surface of the workpiece at shoulder 63 between the shear zone D and the electrode 59. Since the surface of the workpiece moves continuously relative to the tool so that the shear zone D (where the cutting edge of the tool shears the material) is continuously changing, the generator 64 should have sufficient power capacity to effect rapid resistance heating of the shear zone D.

With the electrode 59 located in the direction of workpiece travel from the cutting edge 49 of the tool bit (that is, on the tool side of the chip 52 formed by the cut), a concentrated current flow along shoulder 63, as indicated at 81 in FIG. 6, results in a current flow through the shear zone D which is concentrated on the tool side thereof. The higher the frequency of the generator, the more concentrated will be the flow of current along the surface of the workpiece at the shoulder 63 and at the shear zone area closest to the cutting edge of the tool, which is the precise area where the chip is separating from the workpiece and where heating is most effective in facilitating machining. For this reason, it is preferable to use a generator having a frequency of at least 300 kilocycles per second. Since at high frequencies above 3 megacycles significant power losses from the lead lines 65, 66 would be experienced in the usual installation, it is preferable that the radio frequency generator be in the middle frequency range with a frequency between 300 kilocycles and 3 megacycles per second.

The electrode at the tool may be connected thereto to establish a single current path through the cutting bit (which may be a current conducting cemented carbide bit) but since heat can impair the cutting edge of the tool, it is desirable to minimize the resistance heating thereof by providing in addition to said path, or in lieu of said path, a current path which does not pass through the cutting edge 49 of the tool. This is accomplished by providing an electrode, connected to line 65, to contact the chip, and the chipbreaker 45 on the tool may be conveniently utilized as this electrode. A conventional steel or carbide chipbreaker can be used which may be copper coated to improve the conductivity thereof. When the chip 52 contacts the chipbreaker 45, a current path between electrode 59 and the electrode, or conductor, defined by the chipbreaker 45 is established through the chip 52 around the cutting edge 49 of the bit. When the electrode 59 is located in the direction B of travel of the surface of the workpiece contacting the cutting edge of the tool, the current flowing between the chip 52 and the electrode 59 concentrates on the tool side of the chip, since it seeks the shortest path, and passes through the shear zone D of the workpiece as close as possible to the cutting edge of the tool. Thus heat is concentrated at the lower margin of the workpiece shear zone D (as viewed in FIGS. 5 and 6), the precise area which must be heated to facilitate machining.

Since heat at the shear zone only is desired to facilitate the machining of the workpiece, any heat generated in the workpiece except at the shear zone not only represents wasted energy but can have undesired metallurgical effects. For this reason, to avoid induction heating of the workpiece, the circuit defined in part by lines 65 and 66 should not encircle the workpiece. Similarly heating of the bitholder and bit should be minimized, not only to conserve energy, but because heat generated in these members can seriously impair their strength. While induction heating of these members can be reduced by positioning lines 65 and 66 to avoid encircling the tool, minimum induction heating of these members will occur if they are both of nonmagnetic material. Accordingly, the bitholder may be constructed of, for example, a nickel-cobalt alloy which is nonmagnetic at room temperature (such as the alloy René 41 produced by General Electric Co.), and the bit may be made of a cemented oxide, such as aluminum oxide.

When the only current path between the chipbreaker, or conductor, 45 and the electrode 59 is through the chip 52 (as when a cemented oxide tool bit, which is a good insulator, is used) it is essential that the chip peeling off the rotating workpiece remain in firm electrical contact with the chipbreaker or destructive arcing will occur. There is shown in FIGS. 7 and 8 a bracket 70 mounted on the chipbreaker 45 having one leg 71 clamped with the chipbreaker to bitholder 44 by bolt 72. The bracket 70 has a second leg 73 extending over the chipbreaker and spaced therefrom. An arm 74, pivotally connected to the end of leg 73, has a roller 75 at its free end. The roller 75, which extends from arm 74 into registration with chip 52, is biased by spring 76 extending between arm 74 and leg 73, to urge chip 52 into contact with the face 50 of the chipbreaker.

There is also shown in FIGS. 7 and 8 a conductor 80, clamped by bolt 72 in electrical contact with chipbreaker 45 and engaged with the workpiece 16. This conductor which may be used in lieu of or in conjunction with the means provided to maintain contact between the chip and the chipbreaker, is made of brass and provides a higher impedance current path between the chipbreaker and the workpiece than the path provided through the chip. Thus, when the chip 52 is in firm contact with the chipbreaker 45, most of the current will flow through the chip, but if contact between the chip and chipbreaker is broken, arcing at the chip will be avoided because of the parallel current path defined by conductor 80.

In operation, assume the switch 68 is initially open and the tool out of contact with the workpiece. The motor 14 is energized to rotate the workpiece and air under pressure is supplied to conduit 61 to urge the face 62 of electrode 59 into firm sliding contact with the surface 16a of the workpiece. The tool 39 is brought into contact with the workpiece (by handwheel 31 and/or handwheel 26) and, if the tool bit 43 is a poor conductor, longitudinal feeding movement of the tool 39 is begun (by engagement of the lead screw mechanism or operation of handwheel 26) so that a chip will peel off the workpiece into engagement with the chipbreaker. The chip is guided under roller 75 to assure good contact between the chip and the chipbreaker, and switch 68 is then closed. In the illustrative embodiment shown, the rotation of the workpiece and the longitudinal feeding movement of the tool provides a relative cutting movement between the tool and the workpiece which causes a chip to continuously peel off the workpiece at a shear zone. Although the shear zone is not fixed on the surface of the workpiece, heat producing current is continuously conducted through the shear zone to facilitate the cut.

What is claimed is:

1. The method of hot machining a conductive workpiece comprising the steps of effecting relative movement between the workpiece and a tool engaged therewith including movement in a feed direction, maintaining an electrode in sliding contact with the workpiece a predetermined distance from the tool in said feed direction, and connecting a radio frequency voltage source across the tool and the electrode to heat the workpiece at the tool.

2. The method of hot machining a conductive workpiece comprising the steps of effective relative cutting movement between the workpiece and a tool engaged therewith to form a chip extending from the workpiece, and connecting a source of radio frequency voltage across the chip and a portion of the workpiece near the chip to pass a heating current through the shear zone of the workpiece at the tool.

3. The method of hot machining a conductive workpiece comprising the steps of effecting relative cutting movement between the workpiece and a tool engaged therewith to form a chip extending from the workpiece, and connecting one side of a source of medium frequency voltage to the chip and connecting the other side of said source to the surface of the workpiece near the chip on the tool side thereof to pass a concentrated heat producing current through the shear zone of the workpiece on the tool side thereof.

4. Apparatus for machining a conductive workpiece comprising means to support the workpiece, a cutting tool, means to effect relative cutting movement between the workpiece and the tool to produce a chip extending from the workpiece, a source of radio frequency alternating voltage, a first electrode electrically connected to one side of said source and positioned to contact the chip, and a second electrode electrically connected to the other side of said source and positioned to contact the surface of the workpiece.

5. Apparatus for machining a conductive workpiece comprising means to support the workpiece, a cutting tool, means to effect relative cutting movement between the workpiece and the tool to produce a chip extending from the workpiece, a source of medium frequency alternating voltage, a first electrode electrically connected to one side of said source and positioned to contact the chip, and a second electrode electrically connected to the other side of said source and positioned to contact the surface of the workpiece near the chip and on the tool side thereof.

6. Apparatus for hot machining a conductive workpiece comprising a source of radio frequency alternating voltage, a tool electrically connected to one side of said source and adapted to engage the workpiece for cutting, means to effect relative feeding movement between the workpiece and the tool, and an electrode electrically connected to the other side of said source, said electrode mounted in sliding contact with the workpiece for relative movement therebetween in the direction of feed as relative feeding movement between the tool and the workpiece is effected.

7. In a machine for high temperature machining of a conductive workpiece, the combination comprising means to support the workpiece, a cutting tool mounted for engagement with the workpiece, an electrode mounted for engagement with the workpiece near the tool, and a source of radio frequency alternating voltage connected to said tool and said electrode to pass a radio frequency alternating current through the area of the workpiece adjacent the cutting edge of the tool when the tool is engaged with the workpiece.

8. In a machine for high temperature machining of a conductive workpiece, the combination comprising means to support the workpiece electrically insulated from the machine, a tool support, a tool mounted in the tool support electrically insulated from the machine, said tool positioned for engagement with the workpiece, an electrode electrically insulated from the machine and mounted to engage the workpiece near the tool, and a radio frequency generator having one side connected to the electrode and the other side connected to the tool to pass a radio frequency current through the area of the workpiece adjacent the cutting edge of the tool when the tool is engaged with the workpiece.

9. A machine for high temperature machining of a conductive workpiece comprising in combination a base, a workpiece support mounted on the base and having means to hold a workpiece electrically insulated from the base, a tool support movably mounted on the base, a tool mounted in the tool support and electrically insulated from the base, said tool positioned for cutting engagement with the workpiece and having a conductor positioned to engage the chip peeling off the workpiece during cutting, means to effect relative cutting movement between the workpiece and the tool, an electrode mounted on the tool support and electrically insulated from the tool and base, said electrode positioned to engage the workpiece adjacent the tool, and a radio frequency generator having one side connected to the electrode and the other side connected to the conductor on the tool to pass a radio frequency through the chip when the tool is in cutting engagement with the workpiece.

10. A machine for high temperature machining of a conductive workpiece comprising in combination, a base, a workpiece support mounted on the base having means to hold a workpiece electrically insulated from the base, means to rotate the workpiece, a tool support mounted for movement on the base, a tool mounted in the tool support and electrically insulated from the base, said tool having a cutting edge positioned for cutting engagement with the workpiece and an electrically conducting chipbreaker positioned to engage a chip peeling off a workpiece rotating in cutting engagement with the cutting edge, an electrode mounted on the tool support and electrically insulated therefrom, said electrode positioned to engage the workpiece near the cutting edge and in the direction of workpiece travel therefrom, and a generator operable to produce an alternating voltage of at least 300 kilocycles per second having one side connected to the electrode and the other side connected to the chipbreaker to pass an alternating current through the side of the chip engaged with the cutting edge of the tool.

11. A machine for high temperature machining of a conductive workpiece comprising in combination: a base; a workpiece support mounted on the base and having means to hold a workpiece electrically insulated from the base; means to rotate the workpiece; a tool support mounted for movement on the base; a tool mounted in the tool support and electrically insulated therefrom, said tool comprising a substantially nonmagnetic toolholder, a substantially nonmagnetic bit having a cutting edge positioned for cutting engagement with the workpiece, and an electrically conducting chipbreaker positioned to engage a chip peeling off a workpiece rotating in cutting engagement with the cutting edge; an electrode mounted on the tool support and electrically insulated therefrom, said electrode positioned to engage the workpiece near the cutting edge and in the direction of workpiece travel therefrom; and a generator operable to produce an alternating voltage of at least 300 kilocycles per second having one side connected to the electrode and the other side connected to the chipbreaker to pass an alternating current through the side of the chip engaged with the cutting edge of the tool.

12. A machine for high temperature machining of a conductive workpiece comprising in combination: a base; a workpiece support mounted on the base and having means to hold a workpiece electrically insulated from the base; means to rotate the workpiece; a tool support mounted for movement on the base; a tool mounted in the tool support and electrically insulated therefrom, said tool comprising a nonmagnetic holder, a cemented oxide bit having a cutting edge positioned for cutting engagement with the workpiece, an electrically conducting chipbreaker positioned to engage a chip peeling off a workpiece rotating in cutting engagement with the cutting edge, and means to hold the chip in conducting engagement with the chipbreaker; an electrode mounted on the tool support and electrically insulated therefrom, said electrode positioned to engage the workpiece near the cutting edge of the tool bit and in the direction of workpiece travel therefrom; and a radio frequency generator having one side connected to the electrode and the other side connected to the chipbreaker to pass a radio frequency current through the chip and shear zone of the workpiece.

13. A machine for high temperature machining of a conductive workpiece comprising in combination: a base; a workpiece support mounted on the base and having means to hold a workpiece electrically insulated from the base; means to rotate the workpiece; a tool support mounted for movement on the base; a tool mounted in the tool support and electrically insulated therefrom, said tool comprising a nonmagnetic holder, a cemented oxide bit having a cutting edge positioned for cutting engagement with the workpiece, and an electrically conducting chipbreaker positioned to engage a chip peeling off a workpiece rotating in cutting engagement with said cutting edge; an electrode mounted on the tool support and electrically insulated therefrom, said electrode positioned to engage the workpiece near the cutting edge of the tool bit and in the direction of workpiece travel therefrom; a radio frequency generator having one side connected to the electrode and the other side connected to the chipbreaker to define a first current path of low impedance through the chip and around the cutting edge of the tool; and a conductor of lower conductivity than the chipbreaker connecting the chipbreaker to the workpiece to define a second current path around the chip of higher impedance than said first current path.

14. In a machine for high temperature machining of a conductive workpiece, the combination comprising means to support the workpiece, a cutting tool mounted for engagement with the workpiece, means to effect relative cutting movement between the workpiece and the tool, an electrode mounted for sliding contact with the surface of the workpiece in predetermined closely spaced relation to the tool, and a source of radio frequency alternating voltage connected to said tool and said electrode to pass a radio frequency alternating current through the area of the workpiece adjacent the cutting edge of the tool when the tool is engaged with the workpiece.

15. In a machine for high temperature machining of a conductive workpiece, the combination comprising means to support the workpiece electrically insulated from the machine, a tool support, a tool mounted in the tool support electrically insulated from the machine, said tool positioned for engagement with the workpiece, means to effect relative rotation between the tool and the workpiece, an electrode electrically insulated from the machine and mounted on the tool support for sliding contact with the surface of the workpiece in predetermined closely spaced relation to the tool, means to effect relative feeding movement between the workpiece and the tool support, and a source of radio frequency alternating voltage connected to said tool and said electrode to pass a radio frequency alternating current through the area of the workpiece adjacent the cutting edge of the tool when the tool is engaged with the workpiece.

References Cited in the file of this patent

UNITED STATES PATENTS

| | | |
|---|---|---|
| 416,873 | Tilghman | Dec. 10, 1889 |
| 2,706,234 | Macy | Apr. 12, 1955 |

FOREIGN PATENTS

| | | |
|---|---|---|
| 798,609 | Great Britain | July 23, 1958 |